US012712628B2

(12) United States Patent
Daughtridge et al.

(10) Patent No.: US 12,712,628 B2

(45) Date of Patent: Aug. 18, 2026

(54) VIRTUAL NETWORK FUNCTION FOR SIGNAL CANCELLATION

(71) Applicant: Kratos Integral Holdings LLC, San Diego, CA (US)

(72) Inventors: Stuart Daughtridge, Huntingtown, MD (US); David Wilkinson, Malvern (GB)

(73) Assignee: KRATOS INTEGRAL HOLDINGS LLC., San Diego, CA (US)

( * ) Notice: Subject to any disclaimer, the term of this patent is extended or adjusted under 35 U.S.C. 154(b) by 293 days.

(21) Appl. No.: 18/660,800

(22) Filed: May 10, 2024

(65) Prior Publication Data

US 2025/0350348 A1 Nov. 13, 2025

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ............. H04B 1/10; H04B 1/68; H04B 1/715
See application file for complete search history.

(56) References Cited

U.S. PATENT DOCUMENTS 8,483,336 B2 * 7/2013 Fedde .................. H04B 17/345 375/346
2004/0042569 A1 3/2004 Casabona et al.
2005/0111347 A1 * 5/2005 Breiling ................ H04L 1/0054 375/346
2010/0221997 A1 * 9/2010 Craig ................. H04B 7/18513 455/12.1
2012/0214524 A1 * 8/2012 Wajcer ................ H04B 7/0845 455/502
2018/0019799 A1 1/2018 Potter et al.
2023/0299843 A1 9/2023 Boyd et al.

FOREIGN PATENT DOCUMENTS

KR 101041134 B1 6/2011

OTHER PUBLICATIONS

International Application No. PCT/US2025/026161, International Search Report and Written Opinion, Mailed on Aug. 7, 2025, 15 pages.

* cited by examiner

*Primary Examiner* — Un C Cho
(74) *Attorney, Agent, or Firm* — Kilpatrick Townsend & Stockton LLP

(57) ABSTRACT

Described herein are systems, methods, and other techniques for canceling an interferer signal from a received signal in a satellite communication system. A signal cancellation function is instantiated at a compute infrastructure. A received signal is digitized to produce a digital waveform of the received signal. A virtualized demodulation is performed on the digital waveform of the received signal to produce a bit sequence of the interferer signal. A virtualized modulation is performed on the bit sequence of the interferer signal to produce a digital waveform of the interferer signal. The digital waveform of the received signal is delayed based on one or more delay factors to produce a delayed digital waveform of the received signal. The digital waveform of the interferer signal is subtracted from the delayed digital waveform of the received signal to produce an output digital waveform.

20 Claims, 9 Drawing Sheets

VIRTUAL NETWORK FUNCTION FOR SIGNAL CANCELLATION

BACKGROUND OF THE INVENTION

Satellite communication systems play a crucial role in facilitating global connectivity across diverse applications, including telecommunications, broadcasting, internet services, and remote sensing. These systems operate by transmitting signals between ground-based Earth stations and satellites in orbit. The efficiency and reliability of such systems are important to addressing the increasing demands of contemporary communication and data services. Presently, communications engineers encounter numerous challenges, with a key concern being the optimization of information transmission over limited resources. Given the scarcity of available frequencies for radio signal communication and the rapid growth in the volume of information to be conveyed, there is a need to maximize the efficiency of available frequencies through the use of new hardware and software solutions at the ground stations, terminals, and satellites that make up such communication systems.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of canceling an interferer signal in a satellite communication system, the method comprising: instantiating a signal cancellation function at a compute infrastructure; digitizing a received signal to produce a digital waveform of the received signal, the received signal having been received via an antenna; performing, by the signal cancellation function, a virtualized demodulation on the digital waveform of the received signal to produce a bit sequence of the interferer signal; performing, by the signal cancellation function, a virtualized modulation on the bit sequence of the interferer signal to produce a digital waveform of the interferer signal; delaying the digital waveform of the received signal based on one or more delay factors to produce a delayed digital waveform of the received signal; and subtracting the digital waveform of the interferer signal from the delayed digital waveform of the received signal to produce an output digital waveform.

Example 2 is the method of example(s) 1, further comprising: demodulating the output digital waveform to produce an output bit sequence.

Example 3 is the method of example(s) 1, wherein the one or more delay factors include one or both of: (i) a modulation scheme used to perform the virtualized demodulation and the virtualized modulation or (ii) a sampling rate used to digitize the received signal.

Example 4 is the method of example(s) 1, further comprising: instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

Example 5 is the method of example(s) 4, further comprising: receiving, by the interference detector and analyzer, a frequency at which the output digital waveform is to be demodulated, wherein the interferer frequency associated with the interferer signal is detected based on a proximity between the interferer frequency and the frequency at which the output digital waveform is to be demodulated.

Example 6 is the method of example(s) 1, further comprising: receiving the received signal via the antenna at a ground station communicatively coupled to the compute infrastructure.

Example 7 is the method of example(s) 1, wherein: the digital waveform of the received signal is a digital IF waveform of the received signal; the digital waveform of the interferer signal is a digital IF waveform of the interferer signal; the delayed digital waveform of the received signal is a delayed digital IF waveform of the received signal; and the output digital waveform is an output digital IF waveform.

Example 8 is the method of example(s) 7, further comprising: down converting the received signal such that the received signal is converted from an analog RF signal to an analog IF signal.

Example 9 is the method of example(s) 1, wherein: the digital waveform of the received signal is a digital RF waveform of the received signal; the digital waveform of the interferer signal is a digital RF waveform of the interferer signal; the delayed digital waveform of the received signal is a delayed digital RF waveform of the received signal; and the output digital waveform is an output digital RF waveform.

Example 10 is a non-transitory computer-readable medium comprising instructions that, when executed by one or more processors, cause the one or more processors to perform operations for canceling an interferer signal in a satellite communication system, the operations comprising: instantiating a signal cancellation function at a compute infrastructure; digitizing a received signal to produce a digital waveform of the received signal, the received signal having been received via an antenna; performing, by the signal cancellation function, a virtualized demodulation on the digital waveform of the received signal to produce a bit sequence of the interferer signal; performing, by the signal cancellation function, a virtualized modulation on the bit sequence of the interferer signal to produce a digital waveform of the interferer signal; delaying the digital waveform of the received signal based on one or more delay factors to produce a delayed digital waveform of the received signal; and subtracting the digital waveform of the interferer signal from the delayed digital waveform of the received signal to produce an output digital waveform.

Example 11 is the non-transitory computer-readable medium of example(s) 10, wherein the operations further comprise: demodulating the output digital waveform to produce an output bit sequence.

Example 12 is the non-transitory computer-readable medium of example(s) 10, wherein the one or more delay factors include one or both of: (i) a modulation scheme used to perform the virtualized demodulation and the virtualized modulation or (ii) a sampling rate used to digitize the received signal.

Example 13 is the non-transitory computer-readable medium of example(s) 10, wherein the operations further comprise: instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

Example 14 is the non-transitory computer-readable medium of example(s) 13, wherein the operations further comprise: receiving, by the interference detector and analyzer, a frequency at which the output digital waveform is to be demodulated, wherein the interferer frequency associated with the interferer signal is detected based on a proximity between the interferer frequency and the frequency at which the output digital waveform is to be demodulated.

Example 15 is the non-transitory computer-readable medium of example(s) 10, wherein: the digital waveform of the received signal is a digital RF waveform of the received signal; the digital waveform of the interferer signal is a digital RF waveform of the interferer signal; the delayed digital waveform of the received signal is a delayed digital RF waveform of the received signal; and the output digital waveform is an output digital RF waveform.

Example 16 is a system comprising: one or more processors; and a computer-readable medium comprising instructions that, when executed by the one or more processors, cause the one or more processors to perform operations for canceling an interferer signal, the operations comprising: instantiating a signal cancellation function at a compute infrastructure; digitizing a received signal to produce a digital waveform of the received signal, the received signal having been received via an antenna; performing, by the signal cancellation function, a virtualized demodulation on the digital waveform of the received signal to produce a bit sequence of the interferer signal; performing, by the signal cancellation function, a virtualized modulation on the bit sequence of the interferer signal to produce a digital waveform of the interferer signal; delaying the digital waveform of the received signal based on one or more delay factors to produce a delayed digital waveform of the received signal; and subtracting the digital waveform of the interferer signal from the delayed digital waveform of the received signal to produce an output digital waveform.

Example 17 is the system of example(s) 16, wherein the operations further comprise: demodulating the output digital waveform to produce an output bit sequence.

Example 18 is the system of example(s) 16, wherein the one or more delay factors include one or both of: (i) a modulation scheme used to perform the virtualized demodulation and the virtualized modulation or (ii) a sampling rate used to digitize the received signal.

Example 19 is the system of example(s) 16, wherein the operations further comprise: instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

Example 20 is the system of example(s) 19, wherein the operations further comprise: receiving, by the interference detector and analyzer, a frequency at which the output digital waveform is to be demodulated, wherein the interferer frequency associated with the interferer signal is detected based on a proximity between the interferer frequency and the frequency at which the output digital waveform is to be demodulated.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
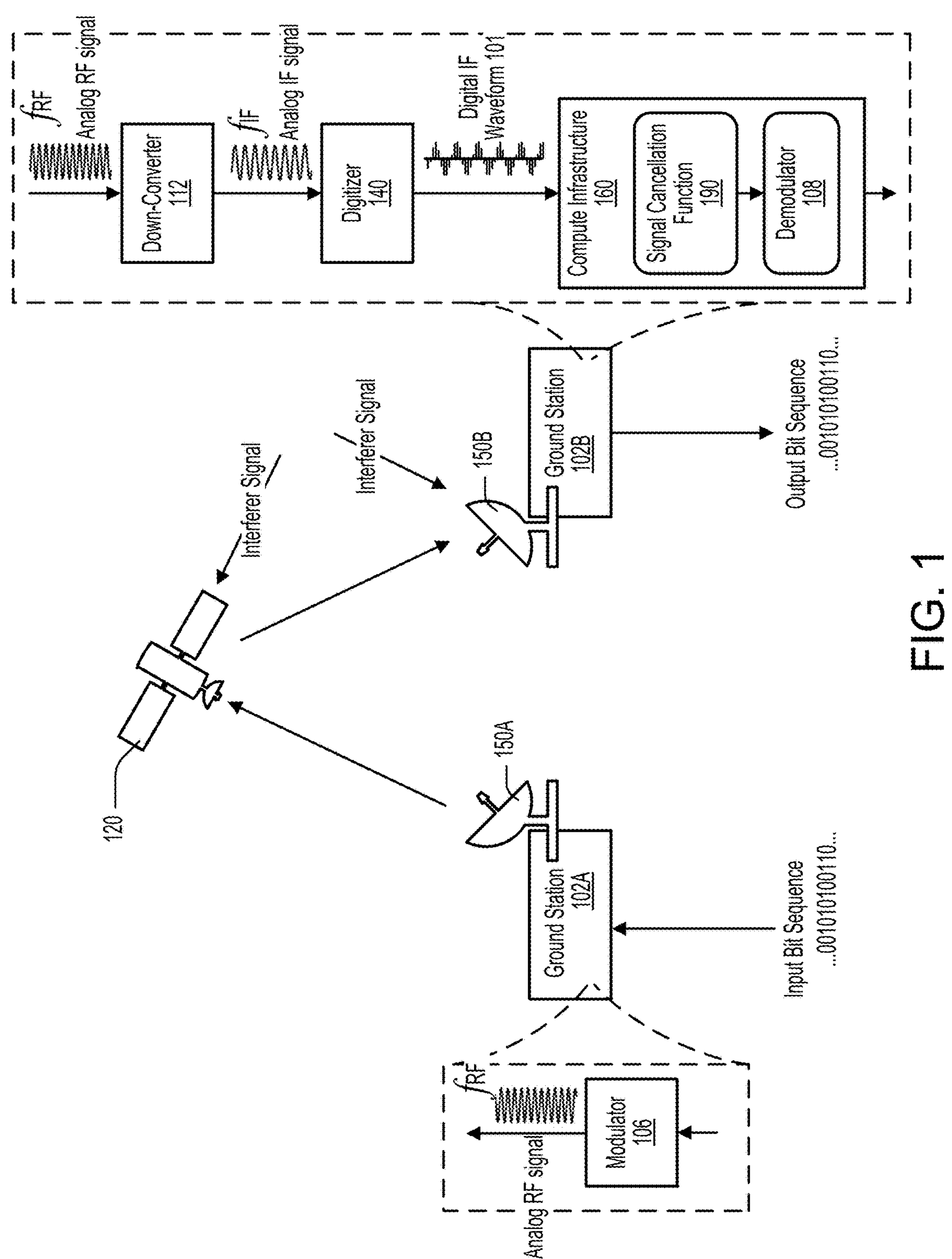
FIG. 1 illustrates an example of satellite communications between a pair of ground stations.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

As noted above, the scarcity of available frequencies for radio signal communication has created a need to maximize the efficiency of available frequencies. This effort has been complicated by intentional and unintentional signal interference, which can cause the loss of valuable frequency space. One way by which interference can be reduced is to put as much separation as possible between each pair of potentially interfering signals. Such separation may be, for example, by separating the signals by frequency, physical distance, or the like. However, separating signals in these ways can reduce the amount of information that can be transmitted between a transmitter and a receiver, because the efficiency with which information can be transmitted over the communication system may be diminished.

Embodiments of the present disclosure relate to a technique for signal cancellation in which a clean copy of the interferer signal is produced and is subtracted from the received signal using one or more virtual network functions (VNFs) or cloud-native network functions (CNFs) running on onsite or offsite infrastructure. In some examples, the received signal is digitized and is sent through two streams within a signal cancellation VNF, the first stream passing through a virtualized demodulator followed by a virtualized modulator to produce a clean copy of the signal to be cancelled, and the second stream passing through a dynamically adjustable delay function to account for the time it takes to create the clean copy of the signal in the first stream. The two streams are combined at a subtractor, which subtracts the signals and produces an output in the same format as the input to the signal cancellation VNF.

Many benefits may be achieved by way of the present disclosure. For example, the signal cancellation VNF described herein can be dynamically deployed within existing or new service chains by a management system in response to a need for signal cancellation in particular reception paths. Furthermore, in contrast to many signal cancellation techniques which rely on local copies of the transmitted signal, the signal cancellation VNF described herein can process received signals without a priori knowledge of the characteristics of the signal. In some examples, the signal cancellation VNF can be used to enhance satcom throughput, where the same frequency spectrum can be used for both the receive and transmit signals. Since a clean copy of the transmitted signal is available, the receiver can remove the transmit signal from the received signal to effectively double the throughput from the same bandwidth. This can be done at both the gateway and remote terminal side.

In some examples, the signal cancellation VNF can enhance signal monitoring and geolocation products that are searching for low-level signals that are underneath larger signals. A geolocation product can use TDOA/FDOA techniques to find the transmission location of a signal, but using both the signal of interest on the primary satellite and finding the same signal on a secondary nearby satellite. This secondary satellite signal is usually very low, often in the noise floor and possibly with a carrier on top of it, which can block detection of this weak copy of the signal. By removing the carrier, better results can be obtained from processing gains to obtain a better geolocation. After reading this description it will become apparent how to implement the invention in various implementations and applications.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 108 may reference element “08” in FIG. 1, and a similar element may be referenced as 208 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example of satellite communications between a pair of ground stations 102 (or “ground-based Earth stations”), in accordance with some embodiments of the present disclosure. In the illustrated example, ground station 102A is communicating with ground station 102B via a satellite 120. In various examples, satellite 120 may send and receive wireless signals within one or more bands of a number of possible frequency bands between 1-300 GHz including, for example, L Band (1-2 GHZ), C-Band (4-8 GHz), X-Band (8-12 GHz), Ku-Band (12-18 GHZ), Ka-Band (26.5-40 GHz), S-Band (2-4 GHZ), and V-Band (40-75 GHZ). Ground stations 102A, 102B may communicate using respective antennas 150A, 150B, which are designed to capture, focus, and direct electromagnetic waves carrying data to establish the satellite communication link. In the illustrated example, ground station 102A is operating in a transmission mode and ground station 102B is operating in a reception mode to communicate a bit sequence between the ground stations.

Ground stations 102 may include onsite and offsite infrastructure to facilitate transmission and reception of data-carrying wireless signals. For example, ground station 102A may include a modulator 106 to generate a signal having a carrier frequency $f_{RF}$ with varying characteristics, such as varying amplitude, frequency, or phase, to encode the input bit sequence for transmission. As another example, ground station 102B may include a down-converter 112 that converts the received signal from radio frequencies (RF) to intermediate frequencies (IF), making the received signal suitable for analog-to-digital conversion. Ground station 102B may also include a digitizer 140 for sampling the waveform at IF frequencies to produce a digital waveform at IF frequencies (“digital IF waveform 101”). The sampling rate of digitizer 140 may be set to be at least twice the maximum frequency of the analog IF signal to avoid aliasing.

In some examples, digital IF waveform 101 is provided to a compute infrastructure 160 that supports a set of VNFs that process digital IF waveform 101 to produce the output bit sequence. Such VNFs may include a signal cancellation function 190 and a demodulator 108. In one example, a managing system may instantiate and configure signal cancellation function 190 to cancel certain frequency components from digital IF waveform 101. Signal cancellation function 190 may, for example, cancel frequency components contributed by an interferer signal. In some examples, the interferer signal is received by satellite 120, causing the signal received by ground station 102B to include a combination of the legitimate signal from ground station 102A and the interferer. In some examples, the interferer signal is transmitted by a different satellite than satellite 120 and is received by ground station 102B directly. In one particular example, the desired signal coming from satellite 120 may be much weaker than an adjacent carrier signal from the interferer. By canceling the adjacent carrier signal, the desired signal may be more easily detectable by the receiving base station. Demodulator 108 may receive the output of signal cancellation function 190 and may convert the output digital IF waveform into baseband or Ethernet frames from which an output bit sequence may be recovered.

Figure 2:
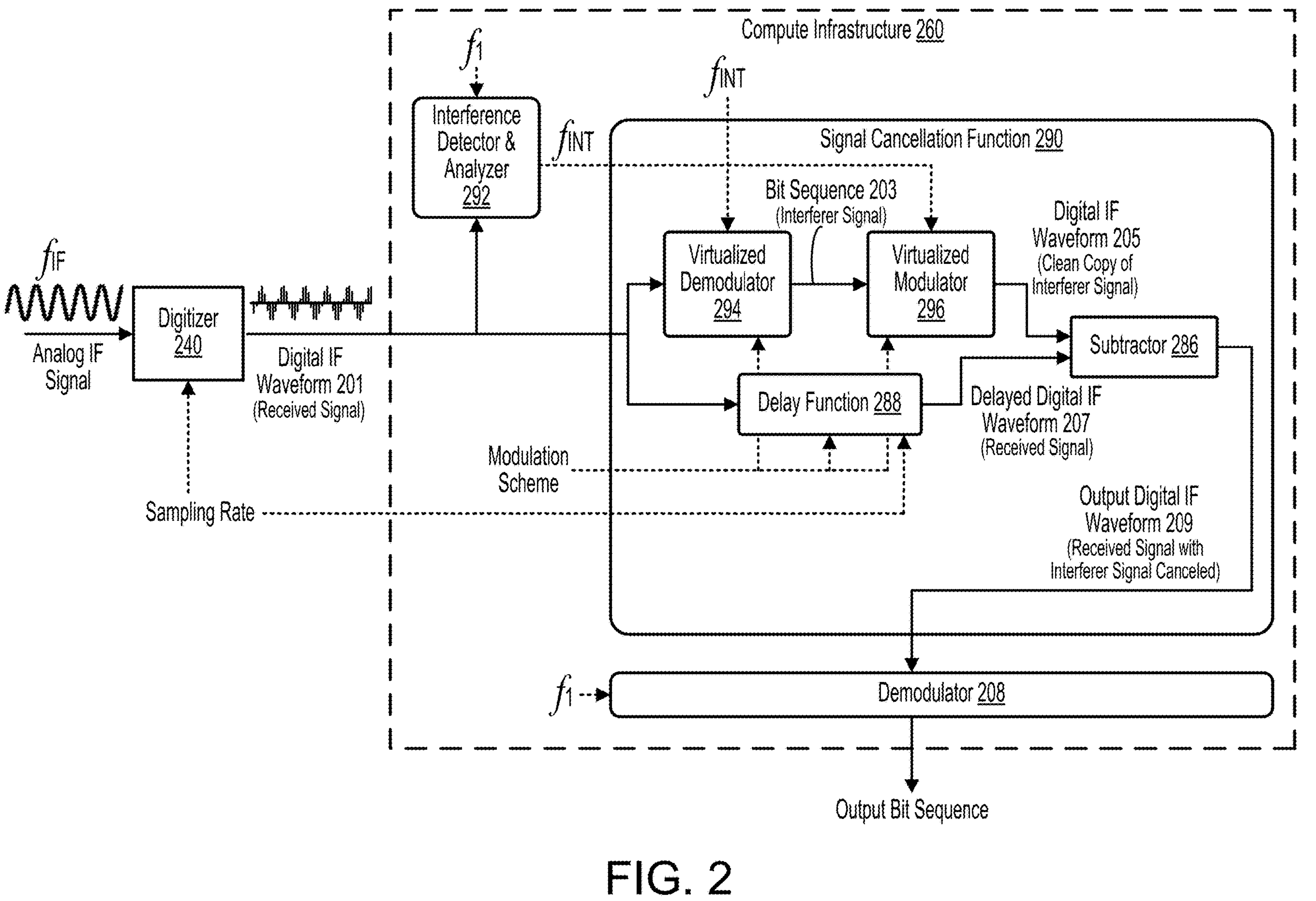
FIG. 2 illustrates an example of a set of VNFs running on a compute infrastructure.

FIG. 2 illustrates an example of a set of VNFs running on a compute infrastructure 260 for processing a received satellite signal, in accordance with some embodiments of the present disclosure. The set of VNFs include a signal cancellation function 290, an interference detector and analyzer 292, and a demodulator 208. A digitizer 240 performs analog-to-digital conversion to sample the analog IF signal to produce a digital IF waveform 201 of the received signal, which is provided to signal cancellation function 290. In some examples, signal cancellation function 290 includes two separate branches including an upper branch having a virtualized demodulator 294 and a virtualized modulator 296, and a lower branch having a delay function 288.

Virtualized demodulator 294 performs a virtualized demodulation on digital IF waveform 201 of the received signal at a particular interferer frequency $f_{INT}$. To accomplish this, virtualized demodulator 294 may multiply (e.g., mix) digital IF waveform 201 with a sinusoid (or complex sinusoid) having a frequency equal to interferer frequency $f_{INT}$, apply a low pass filter, and perform matched filtering to recover a bit sequence 203 of the interferer signal. Since recovery of bit sequence 203 is dependent on the modulation scheme, virtualized demodulator 294 may receive information indicating the modulation scheme that was used to originally encode the input bit sequence onto the carrier signal. Example modulation schemes may include, but are not limited to: quadrature amplitude modulation (QAM), phase shift keying (PSK), binary PSK (BPSK), quadrature PSK (QPSK), differential PSK (DPSK), differential QPSK (DQPSK), amplitude and phase shift keying (APSK), offset QPSK (OQPSK), amplitude shift keying (ASK), minimum-shift keying (MSK), Gaussian MSK (GMSK) among other types of modulation, time division multiple access (TDMA), code division multiple access (CDMA), orthogonal frequency division multiple access (OFDMA), and continuous phase modulation (CPM). Certain modulation types such as for example QAM and APSK may also differ in modulus, for example, 4QAM, 8QAM, and 16APSK, to name a few.

Interferer frequency fixr can be determined by interference detector and analyzer 292 or may be otherwise provided to virtualized demodulator 294 (e.g., set by a management system in communication with signal cancellation function 290). Interference detector and analyzer 292 may, for example, analyze digital IF waveform 201 of the received signal to identify strong frequency components outside the desired frequency. Interference detector and analyzer 292 may receive a desired frequency (e.g., frequency $f_1$) against which nearby frequencies may be searched for strong frequency components. The desired frequency used by interference detector and analyzer 292 may be the same frequency used by demodulator 208 to demodulate the output of signal cancellation function 290.

Virtualized modulator 296 performed a virtualized modulation on bit sequence 203 of the interferer signal to convert bit sequence 203 into a digital IF waveform 205 of a clean copy of the interferer signal. For example, virtualized modulator 296 may perform pulse shaping with the bit sequence, and multiply (e.g., mix) the resulting pulse train with a sinusoid (or complex sinusoid) having a frequency equal to interferer frequency $f_{INT}$ to produce digital IF waveform 205 of the clean copy of the interferer signal. Since encoding of the bit sequence is dependent on the modulation scheme, virtualized modulator 296 may receive information indicating the same modulation scheme used by virtualized demodulator 294 and used to originally encode the input bit sequence.

Passing digital IF waveform 201 of the received signal through the upper path of signal cancellation function 290 will incur delays that may need to be accounted for in the lower path to properly align the signals for subsequent processing. Delay function 288 may estimate the incurred delay and may output a digital IF waveform 207 that is a delayed version of digital IF waveform 201 of the received signal. The amount of delay may be based on several factors, including the modulation scheme used by virtualized demodulator 294 and virtualized modulator 296, the sampling rate used by digitizer 240 (and thus the resolution of the digital IF waveforms), among other possibilities. In some instances, delay function 288 may track a single data point as it travels through the upper path to measure the delay.

The outputs of the upper and lower branches are fed into a subtractor 286, which subtracts digital IF waveform 205 of the clean copy of the interferer signal from a delayed digital IF waveform 207 of the received signal. The output of subtractor 286 is an output digital IF waveform 209 of the received signal with the interferer signal canceled. Demodulator 208 converts the output of signal cancellation function 290 into baseband frames including the output bit sequence based on a desired frequency $f_1$.

Figure 3B:
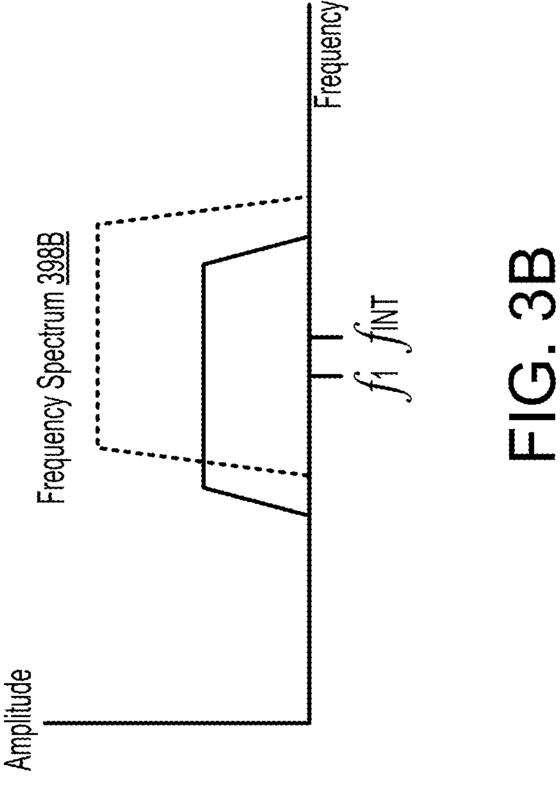
FIGS. 3A and 3B illustrate example frequency spectrums of received signals having components from a desired signal and an interferer signal.
Figure 3A:
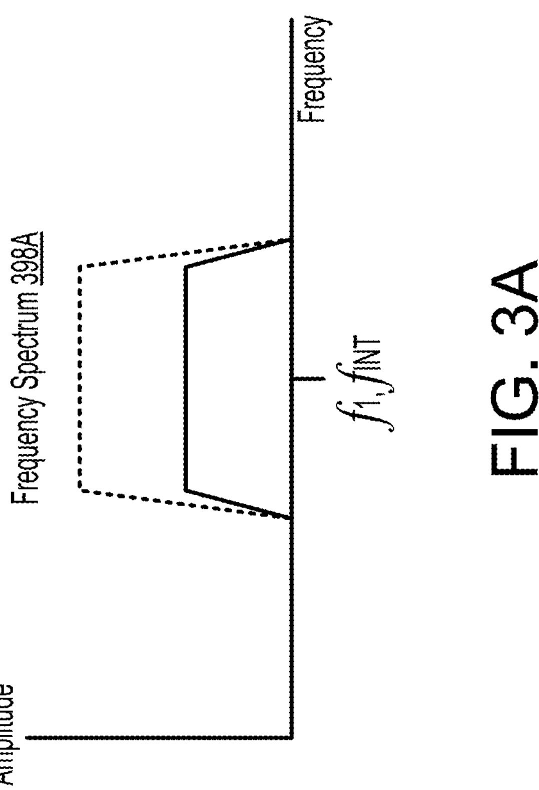

FIGS. 3A and 3B illustrate example frequency spectrums 398 of received signals having components from a desired signal and an interferer signal, the latter of which is cancellable by embodiments of the present disclosure. In FIG. 3A, frequency spectrum 398A includes frequency components in the received signal from the desired signal (shown with solid lines), which is centered at a desired frequency $f_1$, and the interferer signal (shown with dashed lines), which is centered at an interferer frequency fixr placed directly on top of desired frequency $f_1$. In the illustrated example, the amplitude and power of the frequency components from the interferer signal are greater than the amplitude and power of the frequency components from the desired signal.

In FIG. 3B, frequency spectrum 398B includes frequency components in the received signal from the desired signal and the interferer signal which overlap but the center frequencies are offset by a frequency difference, such that desired frequency $f_1$ is not equal to interferer frequency $f_{INT}$. In either of the scenarios illustrated by FIGS. 3A and 3B, the signal cancellation function (e.g., signal cancellation function 290) can use interferer frequency $f_{INT}$ (obtained either through detection or prior knowledge) to remove the frequency components from the interferer signal. In some examples, the signal cancellation function may obtain information regarding the bit sequence of the interferer signal to facilitate removal of the interferer signal.

Figure 4:
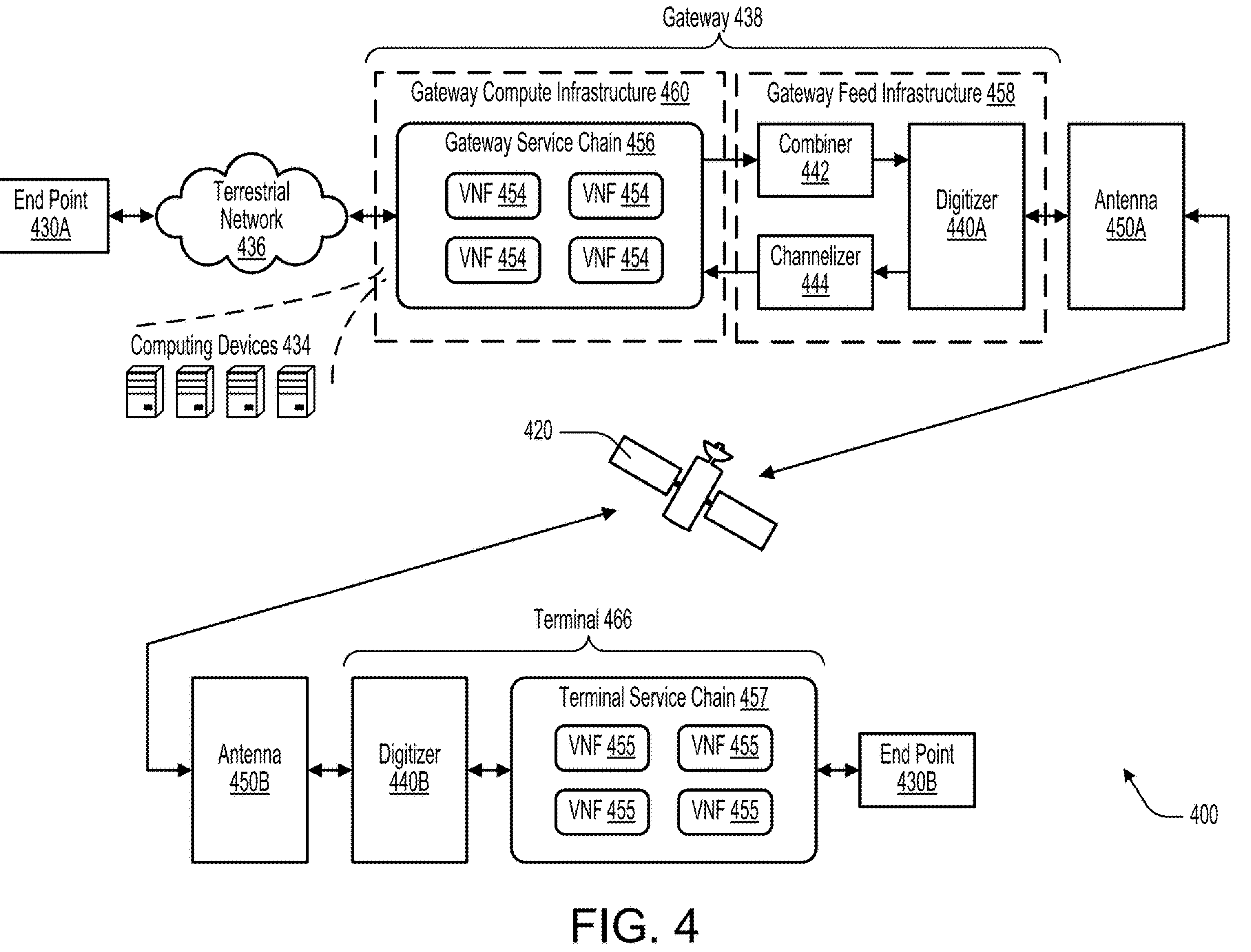
FIG. 4 illustrates an example communication path between end points enabled by a satellite communication system.

FIG. 4 illustrates an example communication path between an end point 430A and an end point 430B enabled by a satellite communication system 400, in accordance with some embodiments of the present disclosure. In the illustrated example, satellite communication system 400 includes a gateway 438 in communication with a terminal 466 via a satellite 420. In various examples, satellite 420 may send and receive wireless signals within one or more bands of a number of possible frequency bands between 1-300 GHz including, for example, 1 GHz and 300 GHz, including L Band (1-2 GHZ), C-Band (4-8 GHZ), X-Band (8-12 GHz), Ku-Band (12-18 GHZ), Ka-Band (26.5-40 GHz), S-Band (2-4 GHZ), and V-Band (40-75 GHz).

In various examples, end points 430 may correspond to portable mobile devices, internet of things (IOT) devices, desktop computers, user terminals, or any of a number of devices with communication capabilities. Alternatively, end points 430 may correspond to networks such as mobile towers, mining sites, ships, planes, or the like. In one example, end point 430A may correspond to a service and end point 430B may correspond to a consumer. It should be understood that the satellite communication environment may comprise other end points 410 and/or other arrangements of components than those illustrated. Furthermore, multiple communication paths may be constructed and operated in parallel, and separate communication paths may have different arrangements from each other.

End point 430A may be communicatively connected via a terrestrial network 436 (e.g., comprising the Internet, a private telecom backbone, or a cloud compute center) to a gateway 438. Gateway 438 may include one or more switches (not shown) to facilitate communication between the various components, such as a first switch at the boundary between terrestrial network 436 and a gateway compute infrastructure 460, and a second switch at the boundary between gateway compute infrastructure 460 and a gateway feed infrastructure 458. Such switches may be physical or virtual Gigabit Ethernet (GigE) switches. However, it should be understood that the above-described first and second switches could be implemented in the same switch. In some examples, the first switch may implement transport from terrestrial network 436 to the User Network Interface (UNI) or the External Network-Network Interface (ENNI) of a directly connected VNF 154 within a gateway service chain 456 as defined by the applicable MEF E-Line or E-Access service standards. Alternatively, the first switch may itself represent the UNI as defined by the applicable MEF E-Tree or E-LAN service standards.

Gateway compute infrastructure 460 may include a set of computing devices 434 situated onsite (at a same physical location) or offsite (at a different physical location) relative to antenna 450. In some examples, computing devices 434 may comprise general-purpose computers or servers capable of running VNFs 454 and other virtualization software such as hypervisors to support gateway service chain 456. In some examples, computing devices 434 may employ x86 architectures, ARM architectures, RISC-V architectures, among other possibilities. Computing devices 434 may be configured as clusters, data centers, warehouse-scale computers, among other possibilities. Gateway compute infrastructure 460 may further include suitable storage systems that provide persistent and reliable storage in support of VNFs 454.

In some examples, gateway compute infrastructure 460 may include a managing system that instantiates and configures one or more VNFs 454 to form gateway service chain 456. Two sets of one or more VNFs 454 may provide two-way communication, including a transmission path and a reception path, between terrestrial network 436 and a gateway feed infrastructure 458 of gateway 456. It should be understood that in an example in which gateway service chain 456 provides only one-way communication, VNFs 454 may provide only a transmission path without providing a reception path. The set of VNFs 454 (e.g., implementing a gateway) on the forward path towards the link to satellite 420, may comprise or constitute a traffic handler, an encapsulator (e.g., implementing generic stream encapsulation (GSE)), a modulator (e.g., the OpenSpace™ Wideband Software modulator, offered by Kratos Defense & Security Solutions, Inc. of San Diego, California), a combiner, an encryption/decryption VNF, a time division multiple access (TDMA) resource allocator, an antenna controller, among other possibilities.

This set of VNFs 454 on the transmission path may convert Ethernet packets into a digital signal (such as a digital intermediate frequency (IF) waveform or a composite digital IF waveform). For example, the traffic handler may process data link layer (e.g., Layer 2 or L2 in the Open Systems Interconnection (OSI) model) and/or network layer (e.g., Layer 3 or L3 in the OSI model) traffic, and provide the processed Ethernet frames to the encapsulator. The encapsulator may convert the Ethernet frames into baseband frames, and provide the baseband frames to the modulator. A baseband frame may be the basic unit of transmission in satellite communication system 400. The encapsulator may form baseband frames in accordance with the 5G standard, the DVB-S2x standard, described in European Telecommunications Standards Institute (ETSI) European Standard (EN) 302 307-1 v1.4.1 (2014-11), among other possible standards. The encapsulator may comprise one or more VNFs 454 (or software subprocesses) that perform one or more of the following functions: frame chopping, forward modulation selection (e.g., with Adaptive Coding and Modulation (ACM)), Ethernet bridge (e.g., Media Access Control (MAC) table, smart bridging/learning/relay, etc.), Address Resolution Protocol (ARP) (e.g., Ethernet MAC discovery), MEF service-delimiter type rewriting (e.g., to rewrite Ethernet frames on ingress/egress based on the MEF definition), over-the-air (OTA) transport header compression for Ethernet virtual connections (e.g., Robust Header Compression (ROHC)); and/or OTA optimization (e.g., Space Communications Protocol Specifications (SCPS)/TCP-Acceleration). The modulator may convert the baseband frames into signal data packets in accordance with a particular standard, including the standards of the Digital Intermediate Frequency Interoperability (DIFI) Consortium in the DIFI/Institute of Electrical and Electronics Engineers (IEEE) 1.0 specification, the VMEbus International Trade Association (VITA) standard, the enhanced Common Public Radio Interface (eCPRI) standard, among other possibilities. In an embodiment, the encapsulator and the modulator may be implemented as a single VNF 454, referred to as a virtualized modem (vModem). The VNF-implemented combiner or a combiner 442 (implemented in hardware) may combine the signal data packets into a digital signal and provide the digital signal to a digitizer 440A, which may convert the digital signal into an analog signal.

The set of VNFs 454 on the return path may comprise or constitute, in order, a digital channelizer (e.g., the OpenSpace™ Wideband Channelizer, offered by Kratos Defense & Security Solutions, Inc. of San Diego, California), a demodulator (e.g., the OpenSpace™ Wideband Software Receiver, offered by Kratos Defense & Security Solutions, Inc. of San Diego, California), and a decapsulator. This set of VNFs 454 on the reception path may convert a digital signal (such as a digital IF waveform or a composite digital IF waveform) to Ethernet packets. For example, the VNF-implemented channelizer or a channelizer 444 (implemented in hardware) may receive a digital signal from digitizer 440A, which has converted an analog signal into the digital signal, and divide the digital signal into signal data packets. The demodulator may convert the signal data packets to baseband frames, and provide the baseband frames to the decapsulator. The decapsulator may convert the baseband frames into Ethernet frames, which may be transmitted, via terrestrial network 436, to end point 430A. It should be understood that the demodulator performs the reverse function(s) of the modulator, and the decapsulator performs the reverse function(s) of the encapsulator. In an embodiment, the decapsulator and demodulator may be implemented as a single VNF 454, for example, together with the encapsulator and modulator, in a vModem. In other words, a vModem may consist of a single VNF 454 that implements all of the functions of the encapsulator/decapsulator and modulator/demodulator.

In some embodiments, in which gateway service chain 456 implements a vModem, the vModem may comprise one or more modulators that are configured to modulate waveforms according to a digital satellite broadcast standard and/or one or more demodulators that are configured to demodulate waveforms according to a digital satellite broadcast standard. Such a vModem may provide carrier ethernet (CE) service, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames. The digital satellite broadcast standard may be a digital satellite television broadcast standard, such as the DVB-S2X standard managed by the Digital Video Broadcasting (DVB) Project. While a digital satellite broadcast standard, such as a DVB standard, is used as an example, the vModem may be configured to modulate and demodulate waveforms according to other standards for wideband digital communication, such as orthogonal frequency-division multiplexing (OFDM), or the like.

The digital signal from combiner 442 is transmitted to digitizer 440A, which converts the digital signal output by combiner 442 into an analog transmission signal for communication to satellite 420. Digitizer 440A further digitizes analog reception signals from satellite 420 into digital signals for use by channelizer 444. In some examples, digitizer 440A may be software-defined. As one example, digitizer 440A may be a SpectralNet™, which is a carrier-grade RF digitizer, offered by Kratos Defense & Security Solutions, Inc. of San Diego, California. Digitizer 440A communicates with antenna 450A. In particular, digitizer 440A provides the transmission signal to antenna 450A, which transmits the transmission signal to satellite 420. In addition, in two-way communications, antenna 450A receives a reception signal from satellite 420, and provides the reception signal to digitizer 440A.

In various examples, antenna 450A may be a parabolic reflector antenna, a flat panel antenna, a phased array antenna, a helical antenna, a patch antenna, a horn antenna, among other possibilities. In some examples, antenna 450A may be an electronically steered antenna that can use electronic means to control the direction and shape of its radiation pattern. Such an antenna can generate multiple beams simultaneously, allowing it to transmit or receive signals in multiple directions at the same time. Antenna 450A may include both the physical antenna as well as the corresponding radio frequency (RF) subsystem, which may include a combination of diplexers, amplifiers (e.g., low noise amplifiers (LNAs)), upconverters, and downconverters (e.g., low-noise block downconverters (LNBs) depending on the specific frequency band and application.

Satellite 420 relays wireless signals from antenna 450A to antenna 450B. In two-way communications, satellite 420 also relays wireless signals from antenna 450B to antenna 450A. Antenna 450B may be functionally similar or identical to antenna 450A, and therefore, any description of antenna 450A applies equally to antenna 450B, which may not be redundantly described herein. Similarly, digitizer 440B may be functionally similar or identical to digitizer 440A, and therefore, any description of digitizer 440A applies equally to digitizer 440B, which may not be redundantly described herein.

Digitizer 440B may communicate directly with a terminal service chain 457 of a terminal compute infrastructure. Terminal service chain 457 may comprise a set of VNF(s) 455 forming a reception path from digitizer 440B to end point 430B. In two-way communications, terminal service chain 457 may also comprise a set of VNFs 455 forming a transmission path from end point 430B to digitizer 440B. The reception and transmission paths may be identical or similar to the reception and transmission paths described with respect to gateway service chain 456. For example, the reception path may comprise a demodulator followed by a decapsulator to convert signal frames into Ethernet packets, and the transmission path may comprise an encapsulator followed by a modulator to convert Ethernet packets into signal frames. The encapslator, decapsulator, modulator, and demodulator may all be similar or identical to those described with respect to gateway service chain 456, and therefore, the descriptions of those components with respect to gateway service chain 456 apply equally to those components in terminal service chain 457.

Terminal service chain 457 may communicate with end point 430B. For example, the decapsulator of terminal service chain 457 may transmit Ethernet packets to end point 430B. In addition, in two-way communications, the encapsulator of terminal service chain 457 may receive Ethernet packets from end point 430B. Thus, the combination of gateway service chain 456 and terminal service chain 457 enable one-way or two-way communications between end points 410A and 410B over a satellite link.

Gateway service chain 456 and terminal service chain 457 may comprise one or more of the software-defined components (e.g., VNFs and/or digitizers) described in International Patent App. Nos. PCT/US2021/033867, filed on May 24, 2021, PCT/US2021/033875, filed on May 24, 2021, PCT/US2021/033905, filed on May 24, 2021, and PCT/US2021/062689, filed on Dec. 9, 2021, which are all hereby incorporated herein by reference as if set forth in full.

Advantageously, the utilization of VNFs and software-defined components (e.g., digitizers 440A and 440B) to perform various functions, aid in automation and scalability. Embodiments may minimize the presence of physical hardware components, such that satellite communication system 400 can be dynamically reconfigured (e.g., added, updated, destroyed, increased or decreased in dimension, etc.) in real time, primarily using in-band network communications, to adapt to the unique multivariate satcom environment (e.g., changing traffic patterns, RF interference, atmospheric characteristics, antenna conditions, path length, etc.).

Notably, dynamic reconfiguration of VNFs in a cloud computing environment can be used, not only to increase the dimensions of the computing resources (e.g., number of vCPUs, amount of memory and/or disk storage, network throughput, etc.) used for satellite communication system 400 on demand to ensure the sufficiency of the satellite communication system, but also to decrease the dimensions of the computing resources on demand to optimize the utilization of the hardware. For example, favorable changes in the satcom environment may improve performance of satellite communication system 400, such that satellite communication system 400 is providing significantly better performance than is required by the service level agreement. In this case, the management system may determine that gateway service chain 456 and terminal service chain 457 are insufficient, and update the service chains to reduce the resources used in the service chains (e.g., by reducing RF bandwidth usage, resizing one or more VNFs, swapping to a service chain with reduced dimensions, etc.). This is in contrast to conventional hardware-based service chains in which unused resources would simply be idled or otherwise ignored, representing a sunk cost that cannot be recouped.

Figure 5:
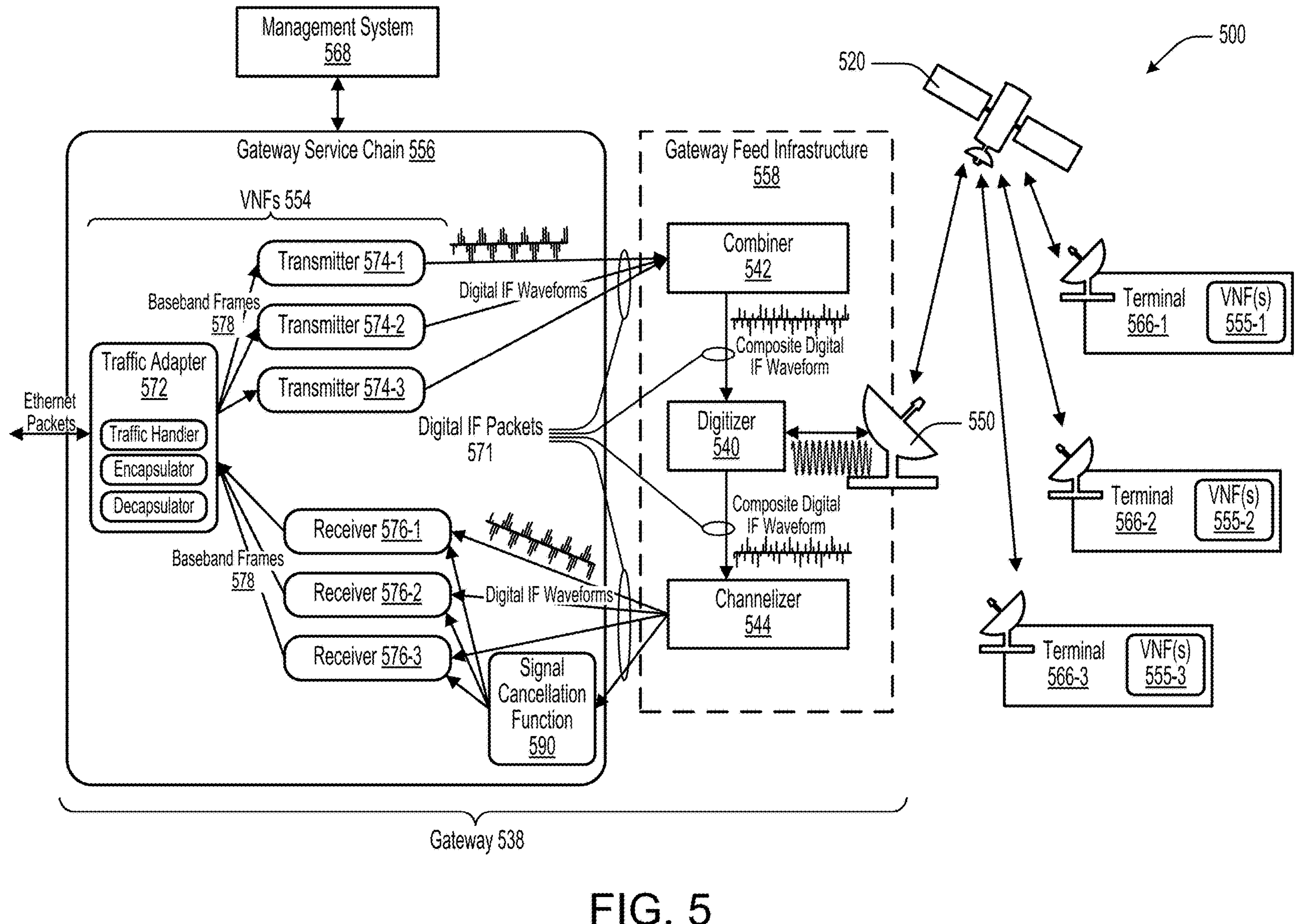
FIG. 5 illustrates an example satellite communication system including a gateway and a set of terminals.

FIG. 5 illustrates an example satellite communication system 500 including a gateway 538 and a set of terminals 566 (or "remote terminals"), in accordance with some embodiments of the present disclosure. In the illustrated example, satellite communication system 500 includes a gateway 538 (or "hub") in communication with each of terminals 566 via a satellite 520. Gateway 538 may include a gateway feed infrastructure 558 that serves as an onsite infrastructure (close to antenna 550, e.g., at a same physical location) that may perform primarily signal digitization and signal routing-related tasks and a gateway compute infrastructure that can be onsite or offsite infrastructure (far from antenna 550, e.g., at a different physical location) that supports a gateway service chain 556 that performs primarily signal processing and packet processing-related tasks. The gateway compute infrastructure may include one or more computers, clusters, a data center, or a warehouse-scale computer. The computing devices comprising the gateway compute infrastructure and/or gateway feed infrastructure 558 may include general-purpose computers or servers employing x86 architectures, ARM architectures, RISC-V architectures, among other possibilities.

Gateway 538 may include a gateway service chain 556 comprising a set of VNFs 554 running on the gateway compute infrastructure. Example VNFs include one or more traffic adapters 572, one or more virtual transmitters 574, one or more virtual receivers 576, one or more signal cancellation function 590, among other possibilities. Each of VNFs 554 may be instantiated and configured by a management system 568 that scales up or down the number of active VNFs based on the number of active terminals 566. Management system 568 may further configure VNFs 554 such that satellite communication system 500 implements any one of a number of network topologies, including a single channel per carrier (SCPC) network, a TDMA network, a frequency division multiple access (FDMA) network, a mesh network, among other possibilities.

VNFs 554 may include one or more virtual transmitters 574 (or "vTX") that provide one or more transmission paths between a terrestrial network and a gateway feed infrastructure 558 of gateway 556. Each of the set of virtual transmitters 574 on a transmission path may comprise or constitute a modulator (e.g., the OpenSpace™ Wideband Software modulator) that converts incoming baseband frames 578 into digital IF packets 571 containing digital waveforms at IF or RF frequencies (or "digital IF waveforms"). Traffic adapter 572 acts as the bridge between the terrestrial network and the satellite network. In some examples, traffic adapter 572 may include a traffic handler that processes data link layer (e.g., Layer 2 in the OSI model) and/or network layer (e.g., Layer 3 in the OSI model) traffic and provides the processed Ethernet frames to the encapsulator, which convert the Ethernet frames into baseband frames 578 and provides baseband frames 578 to one of virtual transmitters 574. Each of virtual transmitters 574 may implement a modulator that converts baseband frames 578 into digital IF packets 571 (e.g., according to the standards of the DIFI Consortium in the DIFI/IEEE 1.2 specification) to create the digital IF waveforms.

Digital IF packets 571 generated by virtual transmitters 574 may be fed into a combiner 542 that combines the multiple digital IF waveforms into a single composite signal (or "composite digital IF waveform"). Digital IF packets 571 containing the composite digital IF waveform is fed into a digitizer 540 that converts the digital signal into an analog signal in preparation for wireless transmission via an antenna 550. While combiner 542 is illustrated in FIG. 5 as being an element of gateway feed infrastructure 558, it is to be understood that a combiner VNF (or multiple combiner VNFs) may be instantiated by management system 568 to perform similar functionality.

On the reception path, digitizer 540 digitizes analog signals received from satellite 520 to generate digital IF packets 571 containing digital IF waveforms (e.g., a composite digital IF waveform) of the received analog signals for use by a channelizer 544. The composite digital IF waveform received by channelizer 544 may be a wide-band spectrum (e.g., 100 MHZ, 500 MHz, 300 GHz, etc.) that may contain several signals within that segment of the frequency band. In some instances, channelizer 544 divides the composite digital IF waveform into separate digital IF waveforms and sends the waveforms (in the form of digital IF packets 571) to appropriate virtual receivers 576. While channelizer 544 is illustrated in FIG. 5 as being an element of gateway feed infrastructure 558, it is to be understood that a channelizer VNF (or multiple channelizer VNFs) may be instantiated by management system 568 to perform similar functionality. VNFs 554 may include one or more virtual receivers 576 (or "vRX") that provide one or more reception paths between gateway feed infrastructure 558 and a terrestrial network. Each of the set of virtual receivers 576 on a reception path may comprise or constitute a demodulator (e.g., the OpenSpace™ Wideband Software Receiver) that converts incoming digital IF packets 571 containing digital IF waveforms into baseband frames 578. In some exapmles, baseband frames 578 produced by virtual receivers are sent to the decapsulator of traffic adapter 572. The decapsulator may convert baseband frames 578 into Ethernet frames and pass the Ethernet frames to the traffic handler, which processes and provides the Ethernet frames to a terrestrial network.

Satellite 520 relays wireless signals from antenna 550 to the antennas of terminals 566, or vice versa. In two-way communications, satellite 520 also relays wireless signals from the antennas of terminals 566 to antenna 550. In some examples, each of terminals 566 may include hardware infrastructure to support one or more VNFs 555. In some examples, VNFs 555 at each of terminals 566 may implement a vModem that comprises one or more modulators that are configured to modulate waveforms according to a digital satellite broadcast standard and/or one or more demodulators that are configured to demodulate waveforms according to the digital satellite broadcast standard. Such a vModem may provide CE service, in which case the vModem may comprise one or more encapsulators that convert Ethernet frames into baseband frames that are modulated into waveforms by the modulator(s), and one or more decapsulators that convert baseband frames, which have been demodulated from waveforms by the demodulator(s), into Ethernet frames.

Figure 6:
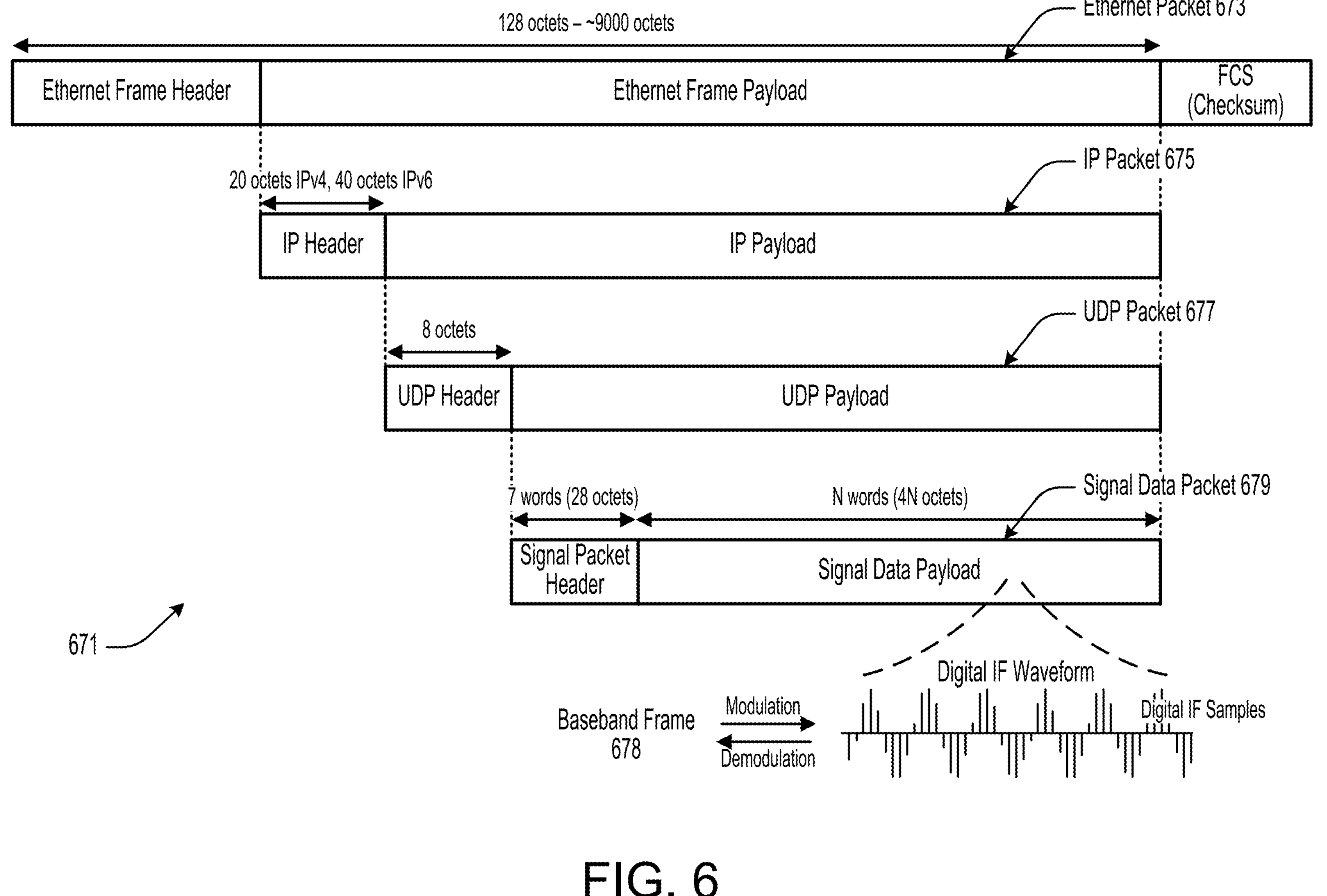
FIG. 6 illustrates an example digital IF packet with multiple protocol layers.

FIG. 6 illustrates an example digital IF packet 671 with multiple protocol layers, in accordance with some embodiments of the present disclosure. In the illustrated example, digital IF packet 671 includes a digital IF waveform contained within the signal data payload of a signal data packet 679. The digital IF waveform may represent the modulated form of one or more baseband frames 678 (or portions of one or more baseband frames 678), such that the baseband frames may be recovered by demodulating the digital IF waveform contained within the signal data payload. Signal data packet 679 may also include a signal packet header, which may implement the VITA standard (e.g., VITA 49.2 specification) or another standard.

In some examples, signal data packet 679 is encapsulated within a UDP packct 677 having a UDP header and UDP payload. UDP packet 677 may be encapsulated within an IP packet 675 having an IP header and IP payload, which may be encapsulated within an Ethernet packet 673 having an Ethernet frame header and Ethernet frame payload. In some examples, the total Ethernet packet size varies based on the number and size of the data samples in the signal data payload of signal data packet 679. There may be a fixed overhead within the Ethernet frame which comprises the IP header (20 octets for IPV4 or 40 octets (minimum) for IPv6), the UDP header (8 octets), the signal packet header (28 octets). In some examples, the Ethernet frame payload is adjustable from 128 octets to approximately 9000 octets.

In some examples, digital IF packet 671 may include different packet classes for signal data packet 679. In a first packet class, signal data packet 679 may be a regular data packet that includes the data for the digital samples forming the digital IF waveform. In a second packet class, signal data packet 679 may be a context packet that includes data to ensure standardization of the transport of metadata describing the sampled signal data. Such data may include the IF reference frequency, the sample rate, the bit depth, the equivalent analog bandwidth of the signal represented by the digital stream, the frequency offset of the center of the band occupied by the signal from the IF reference frequency, among other possibilities. In a third packet class, signal data packet 679 may be a command packet that includes data used to provide and acknowledge device settings and support control of timing to permit synchronization of upstream or downstream devices.

Figures 7A, 7B, 7C:
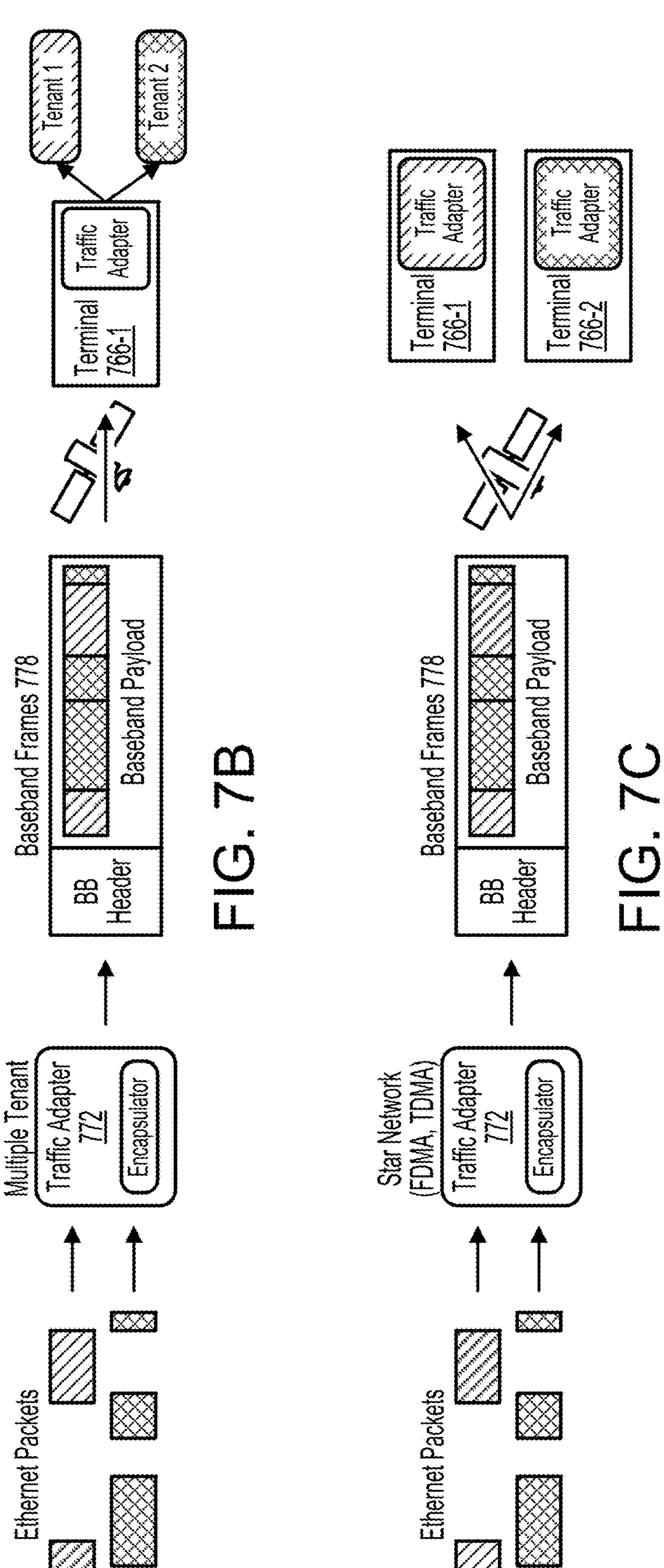
FIGS. 7A-7C illustrate example traffic adapters implementing different network types.

FIGS. 7A-7C illustrate example traffic adapters 772 implementing different network types, in accordance with some embodiments of the present disclosure. In FIG. 7A, traffic adapter 772 is configured by the management system to implement a SCPC (single tenant) network connection type. The encapsulator processes incoming Ethernet packets destined for a terminal 366-1 by encapsulating the packets into a baseband frame 778 and adding an encapsulation header to each packet and a baseband header to the entire baseband frame 778. The encapsulation headers (based on ETSI TS 102 606) include an identifier for terminal 366-1, an identifier of the encapsulated packet's type, and an indicator of the length of the data packet. They may further include information to allow splitting an encapsulated packet into multiple fragments to be distributed over multiple baseband frames 778. The baseband header includes, among other elements, information about the contained encapsulation structure and the total size of the payload. Upon receiving baseband frame 778, a traffic adapter of terminal 366-1 may decapsulate the baseband frame to recover the packets.

In FIG. 7B, traffic adapter 772 is configured by the management system to implement a SCPC (multiple tenant) network connection type. The encapsulator processes a first set of Ethernet packets destined for Tenant 1 via terminal 766-1 and a second set of Ethernet packets destined for Tenant 2 via terminal 766-1 by encapsulating both sets of packets (received within a particular time window) into a single baseband frame 778 and adding a baseband header to baseband frame 778 and individual encapsulation headers to each packet. The encapsulation headers may include an identifier for Tenant 1, an identifier for Tenant 2, an indicator of the encapsulated packet's content, an indicator of the size of the encapsulated packet, and information about fragmentation of the encapsulated packet across multiple baseband frames 778, among other possibilities. The baseband header includes, among other elements, information about the contained encapsulation structure and the total size of the payload. Upon receiving baseband frame 778, the traffic adapter of terminal 766-1 may decapsulate baseband frame 778 to recover and separate the packets, and may route the packets toward Tenant 1 and Tenant 2 as appropriate.

In FIG. 7C, traffic adapter 772 is configured by the management system to implement an FDMA or TDMA network connection type. The encapsulator processes a first set of Ethernet packets destined for terminal 766-1 and a second set of Ethernet packets destined for terminal 766-2 by encapsulating both sets of packets (received within a particular time window) into a single baseband frame 778 and adding a baseband header to baseband frame 778 and individual encapsulation headers to each packet. The encapsulation headers include an identifier for terminal 366-1, an identifier for terminal 366-2, an indicator of the encapsulated packet's content, an indicator of the size of the encapsulated packet, and information about fragmentation of the encapsulated packet across multiple baseband frames 778, among other possibilities. They may further include information to allow splitting an encapsulated packet into multiple fragments to be distributed over multiple baseband frames 778. The baseband header includes, among other elements, information about the contained encapsulation structure and the total size of the payload. Upon receiving baseband frame 778, the traffic adapter of terminal 766-1 may decapsulate baseband frame 778 to recover the packets destined for terminal 766-1, and the traffic adapter of terminal 766-2 may decapsulate baseband frame 778 to recover the packets destined for terminal 766-2.

Figure 8:
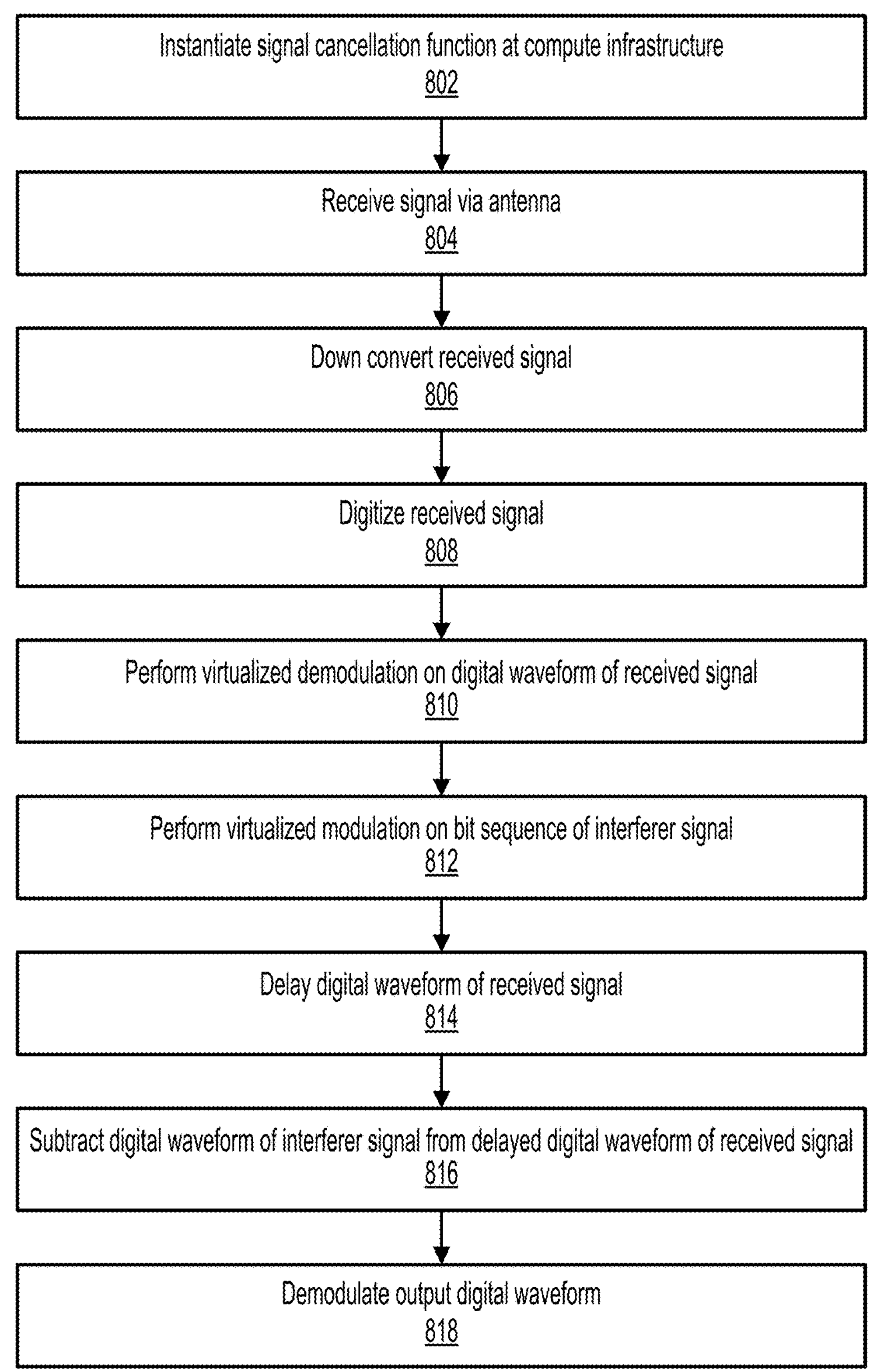
FIG. 8 illustrates a method of canceling an interferer signal from a received signal.

FIG. 8 illustrates a method 800 of canceling an interferer signal from a received signal, in accordance with some embodiments of the present disclosure. Steps of method 800 may be performed in any order and/or in parallel, and one or more steps of method 800 may be optionally performed. One or more steps of method 800 may be performed by one or more processors. Method 800 may be implemented as a computer-readable medium or computer program product comprising instructions which, when the program is executed by one or more processors, cause the one or more processors to carry out the steps of method 800.

At step 802, a signal cancellation function (e.g., signal cancellation functions 190, 290, 590) is instantiated at a compute infrastructure (e.g., compute infrastructures 160, 260, 460). The signal cancellation function may be instantiated by a management system (e.g., management system 568).

At step 804, a signal is received via an antenna (e.g., antennas 150, 450, 550) at a ground station (e.g., ground stations 102) communicatively coupled to the compute infrastructure.

At step 806, the received signal is down converted from an analog RF signal to an analog IF signal.

At step 808, the received signal is digitized to produce a digital waveform (e.g., digital IF waveforms 101, 201) of the received signal. The received signal may be digitized by a digitizer (e.g., digitizers 140, 240, 440, 540). The received signal may be digitized in accordance with a sampling rate.

At step 810, a virtualized demodulation is performed on the digital waveform of the received signal to produce a bit sequence (e.g., bit sequence 203) of the interferer signal. The virtualized demodulation may be performed by a virtualized demodulator (e.g., virtualized demodulator 294) of the signal cancellation function. The virtualized demodulation may be performed based on a modulation scheme.

At step 812, a virtualized modulation is performed on the bit sequence of the interferer signal to produce a digital waveform (e.g., digital IF waveform 205) of the interferer signal. The virtualized modulation may be performed by a virtualized modulator (e.g., virtualized modulator 296) of the signal cancellation function. The virtualized modulation may be performed based on the modulation scheme.

At step 814, the digital waveform of the received signal is delayed based on one or more delay factors to produce a delayed digital waveform (e.g., delayed digital IF waveform 207) of the received signal. The digital waveform of the received signal may be delayed by a delay function (e.g., delay function 288) of the signal cancellation function. The one or more delay factors may include the modulation scheme used to perform the virtualized demodulation and the virtualized modulation. The one or more delay factors may include the sampling rate used to digitize the received signal.

At step 816, the digital waveform of the interferer signal is subtracted from the delayed digital waveform of the received signal to produce an output digital waveform (e.g., output digital IF waveform 209).

At step 818, the output digital waveform is demodulated to produce an output bit sequence. The output digital waveform may be demodulated by a demodulator (e.g., demodulator 208). The output digital waveform may be demodulated using a desired frequency (e.g., $f_1$).

In some examples, method 800 may further include instantiating an interference detector and analyzer (e.g., interference detector and analyzer 292) at the compute infrastructure and detecting, by the interference detector and analyzer, an interferer frequency (e.g., $f_{INT}$) associated with the interferer signal. The interferer frequency may be used to perform the virtualized demodulation and the virtualized modulation. In some examples, method 800 may further include receiving, by the interference detector and analyzer, one or more frequencies (e.g., $f_1$, $f_2$) at which the output digital waveform is to be demodulated. The interferer frequency may be detected based on a proximity between the interferer frequency and the one or more frequencies at which the output digital waveform is to be demodulated.

Figure 9:
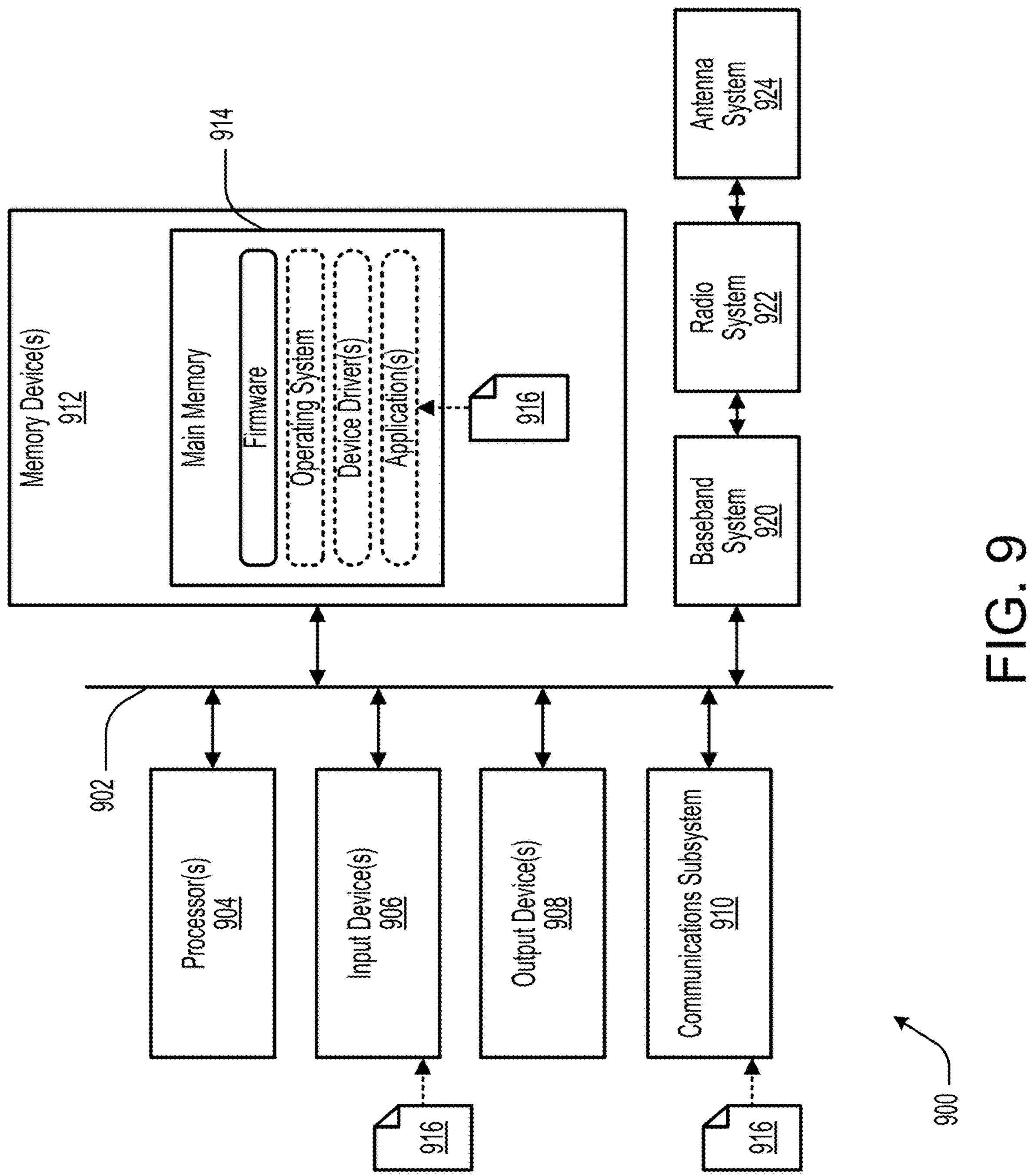
FIG. 9 illustrates an example computer system comprising various hardware elements.

FIG. 9 illustrates an example computer system 900 comprising various hardware elements, in accordance with some embodiments of the present disclosure. Computer system 900 may be incorporated into or integrated with devices described herein and/or may be configured to perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

In the illustrated example, computer system 900 includes a communication medium 902, one or more processor(s) 904, one or more input device(s) 906, one or more output device(s) 908, a communications subsystem 910, one or more memory device(s) 912, a baseband system 920, a radio system 922, and an antenna system 924. Computer system 900 may be implemented using various hardware implementations and embedded system technologies. For example, one or more elements of computer system 900 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 900 may be communicatively coupled via communication medium 902. While communication medium 902 is illustrated as a single connection for purposes of clarity, it should be understood that communication medium 902 may include various numbers and types of communication media for transferring data between hardware elements. For example, communication medium 902 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 902 may include one or more buses that connect the pins of the hardware elements of computer system 900. For example, communication medium 902 may include a bus that connects processor(s) 904 with main memory 914, referred to as a system bus, and a bus that connects main memory 914 with input device(s) 906 or output device(s) 908, referred to as an expansion bus. The system bus may itself consist of several buses, including an address bus, a data bus, and a control bus. The address bus may carry a memory address from processor(s) 904 to the address bus circuitry associated with main memory 914 in order for the data bus to access and carry the data contained at the memory address back to processor(s) 904. The control bus may carry commands from processor(s) 904 and return status signals from main memory 914. Each bus may include multiple wires for carrying multiple bits of information and each bus may support serial or parallel transmission of data.

Processor(s) 904 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 904 may include one or more multi-core processors, in which each core may read and execute program instructions concurrently with the other cores, increasing speed for programs that support multithreading.

Input device(s) 906 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 906 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 908 may include one or more of various devices that convert information into human-readable form, such as without limitation a display device, a speaker, a printer, a haptic or tactile device, and/or the like. Output device(s) 908 may also include devices for writing to removable storage devices or other removable media, such as those described in reference to input device(s) 906. Output device(s) 908 may also include various actuators for causing physical movement of one or more components. Such actuators may be hydraulic, pneumatic, electric, and may be controlled using control signals generated by computer system 900.

Communications subsystem 910 may include hardware components for connecting computer system 900 to systems or devices that are located external to computer system 900, such as over a computer network. In various embodiments, communications subsystem 910 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 912 may include the various data storage devices of computer system 900. For example, memory device(s) 912 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 904 and memory device (s) 912 are illustrated as being separate elements, it should be understood that processor(s) 904 may include varying levels of on-processor memory, such as processor registers and caches that may be utilized by a single processor or shared between multiple processors.

Memory device(s) 912 may include main memory 914, which may be directly accessible by processor(s) 904 via the address and data buses of communication medium 902. For example, processor(s) 904 may continuously read and execute instructions stored in main memory 914. As such, various software elements may be loaded into main memory 914 to be read and executed by processor(s) 904 as illustrated in FIG. 9. Typically, main memory 914 is volatile memory, which loses all data when power is turned off and accordingly needs power to preserve stored data. Main memory 914 may further include a small portion of non-volatile memory containing software (e.g., firmware, such as BIOS) that is used for reading other software stored in memory device(s) 912 into main memory 914. In some embodiments, the volatile memory of main memory 914 is implemented as RAM, such as dynamic random-access memory (DRAM), and the non-volatile memory of main memory 914 is implemented as read-only memory (ROM), such as flash memory, erasable programmable read-only memory (EPROM), or electrically erasable programmable read-only memory (EEPROM).

Computer system 900 may include software elements, shown as being currently located within main memory 914, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 916, which are executable by computer system 900. In one example, such instructions 916 may be received by computer system 900 using communications subsystem 910 (e.g., via a wireless or wired signal that carries instructions 916), carried by communication medium 902 to memory device(s) 912, stored within memory device(s) 912, read into main memory 914, and executed by processor(s) 904 to perform one or more steps of the described methods. In another example, instructions 916 may be received by computer system 900 using input device(s) 906 (e.g., via a reader for removable media), carried by communication medium 902 to memory device(s) 912, stored within memory device(s) 912, read into main memory 914, and executed by processor(s) 904 to perform one or more steps of the described methods.

Computer system 900 may include optional wireless communication components that facilitate wireless communication over a voice network and/or a data network. The wireless communication components comprise an antenna system 924, a radio system 922, and a baseband system 920. In computer system 900, RF signals are transmitted and received over the air by antenna system 924 under the management of radio system 922. In an embodiment, antenna system 924 may comprise one or more antennae and one or more multiplexors (not shown) that perform a switching function to provide antenna system 924 with transmit and receive signal paths. In the reception path, received RF signals can be coupled from a multiplexor to a low noise amplifier (not shown) that amplifies the received RF signal and sends the amplified signal to radio system 922. In an alternative embodiment, radio system 922 may comprise one or more radios that are configured to communicate over various frequencies. In an embodiment, radio system 922 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 922 to baseband system 920.

In some embodiments of the present disclosure, instructions 916 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 900. For example, the non-transitory computer-readable medium may be one of memory device(s) 912 (as shown in FIG. 9). In some cases, the non-transitory computer-readable medium may be separate from computer system 900. In one example, the non-transitory computer-readable medium may be a removable medium provided to input device(s) 906 (as shown in FIG. 9), such as those described in reference to input device(s) 906, with instructions 916 being read into computer system 900 by input device(s) 906. In another example, the non-transitory computer-readable medium may be a component of a remote electronic device, such as a mobile phone, that may wirelessly transmit a data signal that carries instructions 916 to computer system 900 and that is received by communications subsystem 910 (as shown in FIG. 9).

Instructions 916 may take any suitable form to be read and/or executed by computer system 900. For example, instructions 916 may be source code (written in a human-readable programming language such as Java, C, C++, C#, Python), object code, assembly language, machine code, microcode, executable code, and/or the like. In one example, instructions 916 are provided to computer system 900 in the form of source code, and a compiler is used to translate instructions 916 from source code to machine code, which may then be read into main memory 914 for execution by processor(s) 904. As another example, instructions 916 are provided to computer system 900 in the form of an executable file with machine code that may immediately be read into main memory 914 for execution by processor(s) 904. In various examples, instructions 916 may be provided to computer system 900 in encrypted or unencrypted form, compressed or uncompressed form, as an installation package or an initialization for a broader software deployment, among other possibilities.

In one aspect of the present disclosure, a system (e.g., computer system 900) is provided to perform methods in accordance with various embodiments of the present disclosure. For example, some embodiments may include a system comprising one or more processors (e.g., processor(s) 904) that are communicatively coupled to a non-transitory computer-readable medium (e.g., memory device(s) 912 or main memory 914). The non-transitory computer-readable medium may have instructions (e.g., instructions 916) stored therein that, when executed by the one or more processors, cause the one or more processors to perform the methods described in the various embodiments.

In another aspect of the present disclosure, a computer-program product that includes instructions (e.g., instructions 916) is provided to perform methods in accordance with various embodiments of the present disclosure. The computer-program product may be tangibly embodied in a non-transitory computer-readable medium (e.g., memory device(s) 912 or main memory 914). The instructions may be configured to cause one or more processors (e.g., processor(s) 904) to perform the methods described in the various embodiments.

In another aspect of the present disclosure, a non-transitory computer-readable medium (e.g., memory device(s) 912 or main memory 914) is provided. The non-transitory computer-readable medium may have instructions (e.g., instructions 916) stored therein that, when executed by one or more processors (e.g., processor(s) 904), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of canceling an interferer signal in a satellite communication system, the method comprising:

instantiating a signal cancellation function at a compute infrastructure;

digitizing a received signal to produce a digital waveform of the received signal, the received signal having been received via an antenna;

performing, by the signal cancellation function, a virtualized demodulation on the digital waveform of the received signal to produce a bit sequence of the interferer signal;

performing, by the signal cancellation function, a virtualized modulation on the bit sequence of the interferer signal to produce a digital waveform of the interferer signal;

delaying the digital waveform of the received signal based on one or more delay factors to produce a delayed digital waveform of the received signal; and subtracting the digital waveform of the interferer signal from the delayed digital waveform of the received signal to produce an output digital waveform.

2. The method of claim 1, further comprising:

demodulating the output digital waveform to produce an output bit sequence.

3. The method of claim 1, wherein the one or more delay factors include one or both of: (i) a modulation scheme used to perform the virtualized demodulation and the virtualized modulation or (ii) a sampling rate used to digitize the received signal.

4. The method of claim 1, further comprising:

instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

5. The method of claim 4, further comprising:

receiving, by the interference detector and analyzer, a frequency at which the output digital waveform is to be demodulated, wherein the interferer frequency associated with the interferer signal is detected based on a proximity between the interferer frequency and the frequency at which the output digital waveform is to be demodulated.

6. The method of claim 1, further comprising:

receiving the received signal via the antenna at a ground station communicatively coupled to the compute infrastructure.

7. The method of claim 1, wherein:

the digital waveform of the received signal is a digital IF waveform of the received signal;

the digital waveform of the interferer signal is a digital IF waveform of the interferer signal;

the delayed digital waveform of the received signal is a delayed digital IF waveform of the received signal; and the output digital waveform is an output digital IF waveform.

8. The method of claim 7, further comprising:

down converting the received signal such that the received signal is converted from an analog RF signal to an analog IF signal.

9. The method of claim 1, wherein:

the digital waveform of the received signal is a digital RF waveform of the received signal;

the digital waveform of the interferer signal is a digital RF waveform of the interferer signal;

the delayed digital waveform of the received signal is a delayed digital RF waveform of the received signal; and the output digital waveform is an output digital RF waveform.

10. A non-transitory computer-readable medium comprising instructions that, when executed by one or more processors, cause the one or more processors to perform operations for canceling an interferer signal in a satellite communication system, the operations comprising:

instantiating a signal cancellation function at a compute infrastructure;

digitizing a received signal to produce a digital waveform of the received signal, the received signal having been received via an antenna;

performing, by the signal cancellation function, a virtualized demodulation on the digital waveform of the received signal to produce a bit sequence of the interferer signal;

performing, by the signal cancellation function, a virtualized modulation on the bit sequence of the interferer signal to produce a digital waveform of the interferer signal;

delaying the digital waveform of the received signal based on one or more delay factors to produce a delayed digital waveform of the received signal; and subtracting the digital waveform of the interferer signal from the delayed digital waveform of the received signal to produce an output digital waveform.

11. The non-transitory computer-readable medium of claim 10, wherein the operations further comprise:

demodulating the output digital waveform to produce an output bit sequence.

12. The non-transitory computer-readable medium of claim 10, wherein the one or more delay factors include one or both of: (i) a modulation scheme used to perform the virtualized demodulation and the virtualized modulation or (ii) a sampling rate used to digitize the received signal.

13. The non-transitory computer-readable medium of claim 10, wherein the operations further comprise:

instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

14. The non-transitory computer-readable medium of claim 13, wherein the operations further comprise:

receiving, by the interference detector and analyzer, a frequency at which the output digital waveform is to be demodulated, wherein the interferer frequency associated with the interferer signal is detected based on a proximity between the interferer frequency and the frequency at which the output digital waveform is to be demodulated.

15. The non-transitory computer-readable medium of claim 10, wherein:

the digital waveform of the received signal is a digital RF waveform of the received signal;

the digital waveform of the interferer signal is a digital RF waveform of the interferer signal;

the delayed digital waveform of the received signal is a delayed digital RF waveform of the received signal; and the output digital waveform is an output digital RF waveform.

16. A system comprising:

one or more processors; and a computer-readable medium comprising instructions that, when executed by the one or more processors, cause the one or more processors to perform operations for canceling an interferer signal, the operations comprising:

instantiating a signal cancellation function at a compute infrastructure;

digitizing a received signal to produce a digital waveform of the received signal, the received signal having been received via an antenna;

performing, by the signal cancellation function, a virtualized demodulation on the digital waveform of the received signal to produce a bit sequence of the interferer signal;

performing, by the signal cancellation function, a virtualized modulation on the bit sequence of the interferer signal to produce a digital waveform of the interferer signal;

delaying the digital waveform of the received signal based on one or more delay factors to produce a delayed digital waveform of the received signal; and subtracting the digital waveform of the interferer signal from the delayed digital waveform of the received signal to produce an output digital waveform.

17. The system of claim 16, wherein the operations further comprise:

demodulating the output digital waveform to produce an output bit sequence.

18. The system of claim 16, wherein the one or more delay factors include one or both of: (i) a modulation scheme used to perform the virtualized demodulation and the virtualized modulation or (ii) a sampling rate used to digitize the received signal.

19. The system of claim 16, wherein the operations further comprise:

instantiating an interference detector and analyzer at the compute infrastructure; and detecting, by the interference detector and analyzer, an interferer frequency associated with the interferer signal, wherein the interferer frequency is used to perform the virtualized demodulation and the virtualized modulation.

20. The system of claim 19, wherein the operations further comprise:

receiving, by the interference detector and analyzer, a frequency at which the digital waveform is to be demodulated, wherein the interferer frequency associated with the interferer signal is detected based on a proximity between the interferer frequency and the frequency at which the output digital waveform is to be demodulated.

* * * * *